(12) United States Patent
Montagnon

(10) Patent No.: US 6,779,401 B2
(45) Date of Patent: Aug. 24, 2004

(54) DEVICE FOR MEASURING THE RUNNING PARAMETERS OF A BICYCLE

(75) Inventor: Bruno Montagnon, Metz-Tessy (FR)

(73) Assignee: Mavic S.A., Metz-Tessy (FR)

( * ) Notice: Subject to any disclaimer, the term of this patent is extended or adjusted under 35 U.S.C. 154(b) by 0 days.

(21) Appl. No.: 10/209,892

(22) Filed: Aug. 2, 2002

(65) Prior Publication Data

US 2003/0024310 A1 Feb. 6, 2003

(30) Foreign Application Priority Data

Aug. 3, 2001 (FR) .............................. 01 10517

(51) Int. Cl.$^7$ .......................... G01P 15/00; B62J 6/00; C06F 7/00
(52) U.S. Cl. .................... 73/489; 73/865.9; 340/432; 701/1
(58) Field of Search ............................ 73/490, 865.9, 73/489; 340/432, 441, 462, 670, 672; 324/168, 178, 179; 701/1

(56) References Cited

U.S. PATENT DOCUMENTS

| | | | | |
|---|---|---|---|---|
| 4,023,165 A | * | 5/1977 | Holt et al. ..................... 342/26 |
| 4,071,892 A | * | 1/1978 | Genzling .................... 701/200 |
| 5,008,647 A | * | 4/1991 | Brunt et al. ................. 340/432 |
| 5,170,161 A | | 12/1992 | Sakurai .................... 340/870.3 |
| 5,511,435 A | | 4/1996 | Kitamura et al. ........... 73/865.9 |
| 5,585,780 A | * | 12/1996 | Sakashita ..................... 340/432 |
| 6,023,646 A | * | 2/2000 | Kubacsi et al. ................. 701/1 |
| 2001/0027359 A1 | | 10/2001 | Campagnolo | |

FOREIGN PATENT DOCUMENTS

| | | |
|---|---|---|
| EP | 0402620 | 12/1990 |
| EP | 0650031 | 4/1995 |
| FR | 2794715 | 12/2000 |
| FR | 2807240 | 10/2001 |

\* cited by examiner

*Primary Examiner*—Helen Kwok
(74) *Attorney, Agent, or Firm*—Greenblum & Bernstein, P.L.C.

(57) ABSTRACT

A device for measuring the running parameters of a bicycle having a sensor capable of reacting to a revolution of a rotationally movable member through a change of state and operating according to a cycle of changes of state, the sensor being provided to be mounted on a rotatable member of the bicycle, a transmission circuit having an antenna, a reception circuit having an antenna. The transmitting circuit has a circuit for calculating a value of the running parameter based on the signal originating from the sensor, a transmitter connected to the antenna to transmit this value to the receiving device, and an optimization circuit for activating the transmission of the transmitter to moments independent of the changes of state of the sensor.

28 Claims, 4 Drawing Sheets

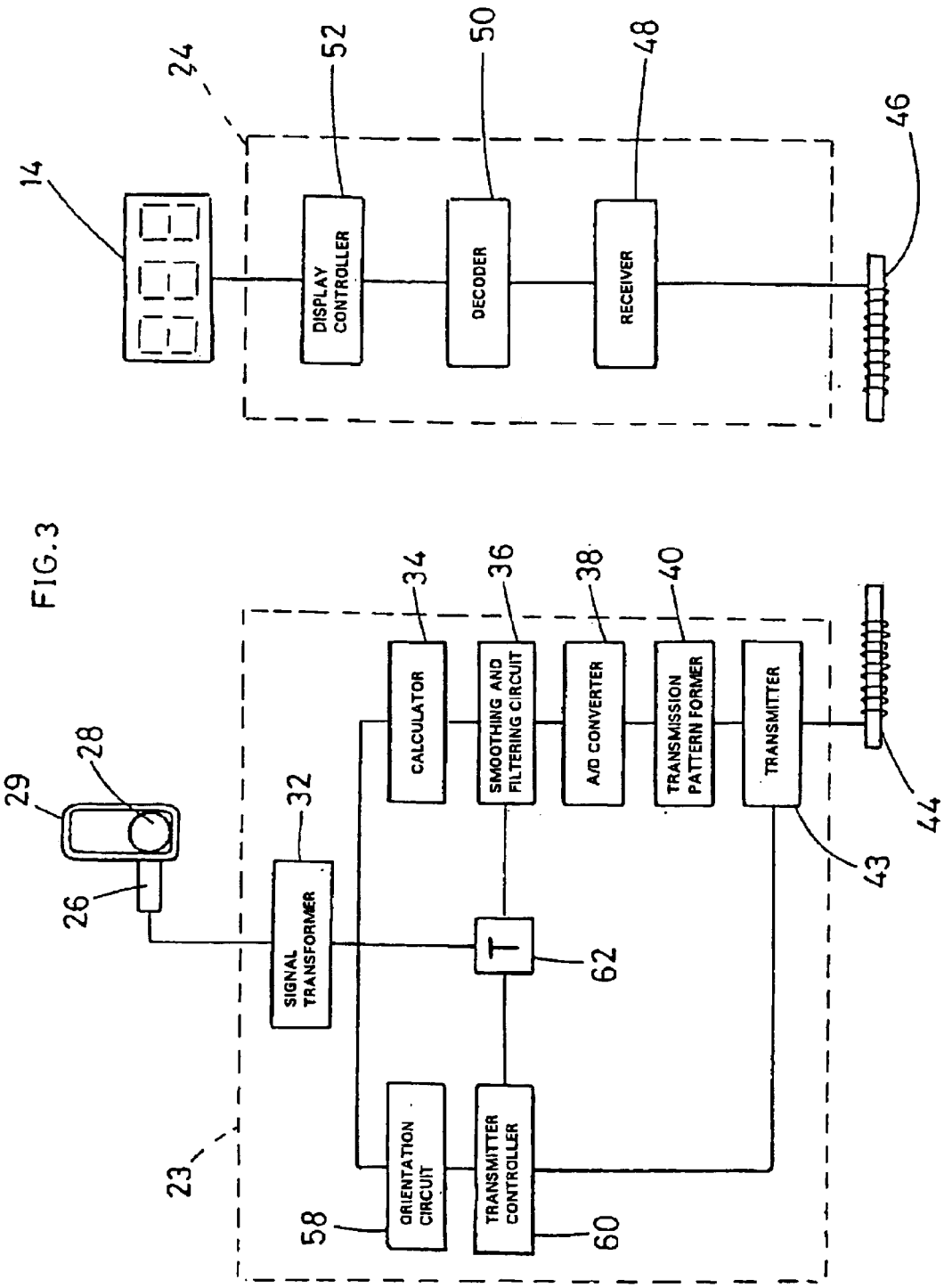

DEVICE FOR MEASURING THE RUNNING PARAMETERS OF A BICYCLE

CROSS-REFERENCE TO RELATED APPLICATION

This application is based upon French Patent Application No. 01.10517, filed Aug. 3, 2001, the disclosure of which is hereby incorporated by reference thereto in its entirety, and the priority of which is hereby claimed under 35 U.S.C. §119.

BACKGROUND OF THE INVENTION

1. Field of the Invention

The invention relates to a device for measuring the running parameters of a bicycle. The invention also relates to a bicycle equipped with this device.

In particular, the invention relates to a device for measuring the rotating speed of a wheel and/or the pedaling rate.

2. Description of Background and Relevant Information

In order to measure the rotating speed of a member such as a wheel or a pedal crank, one generally uses as a sensor a Reed relay mounted on the frame and activated by a magnet attached to the movable member.

French Patent Publication No. 2 794 715 calls for this type of device for measuring the pedaling rate. The magnet is mounted on the pedal axis and activates a Reed relay attached to the frame.

European Patent Application No. 402 620, and corresponding U.S. Pat. No. 5,170,161, relate to this type of device that measures the rotating speed of the wheel. This device further has the characteristic of having a wireless connection between the processing unit that is controlled by the Reed relay and the display unit that is located on the handlebar. The sensor and the processing unit are mounted on one of the stays of the fork, the magnet is attached to a wheel spoke, and the display unit is installed on the steering handlebars.

In this case, the sensor is mounted on the bicycle frame and it is a passive element, in this case a magnet, that is attached to the moving member. In addition, for this wireless device, it is the passing of the magnet in front of the Reed bulb, or reed switch, which activates the processing unit transmitter. One measures the rotating speed by measuring the time elapsed between two successive transmitter transmissions. In other words, the transmitter is activated at each turn of the wheel, at each turn it transmits in the direction of the receiver and at each turn the processing unit receiver recalculates the speed. For a bicycle traveling at 36 km/hr, the wheel does about five turns per second. This means that the transmitter transmits to the receiver and the speed is recalculated five times in one second.

For each transmission the transmitter draws energy from the battery.

These wireless devices are easy to install precisely because of the wireless connection between the transmitter and the receiver. Nevertheless, these devices call for a measurement refresh rate that exceeds what is actually necessary, and there is a substantial consumption of energy by the transmitter.

Another drawback to these devices is that the position of the magnet with respect to the Reed bulb has to be adjusted so that the magnet passes properly in front of the bulb at the right distance. Frequently, when the wheel is dismounted or when the bicycle is transported, the magnet moves accidentally. In this case, it needs re-adjusting.

Furthermore, transmission between the transmitter and the receiver generally occurs by means of directional antennas in order to decrease the transmission power required, as well as interfering transmissions. To ensure proper functioning, these antennas need to be oriented precisely with respect to one another, such that it has never been envisioned until now to mount the transmitter and the receiver differently than to have both of them attached to the bicycle frame so that they are immovably or almost immovably fixed with respect to one another.

SUMMARY OF THE INVENTION

One object of the invention is to propose a wireless measuring device having a reduced power consumption with respect to the prior art devices.

Another object of the invention is to propose a measuring device that is simpler to install on the bicycle.

Other objects and advantages of the invention will become apparent through the description that follows.

The device for measuring the running parameters of a bicycle include:

a sensor capable of reacting to a revolution of a rotationally movable member through a change of state and operating along a cycle of changes of state, the sensor being provided to be mounted on a rotatable member of the bicycle;

a transmission circuit having an antenna;

a reception circuit having an antenna.

The transmission circuit has a circuit for calculating a value of the running parameter based on the signal originating from the sensor, a transmitter connected to the antenna to transmit this value to the receiving device, and an optimization circuit for activating the transmission of the transmitter at moments independent of the changes of state of the sensor, or independent of the periodicity of the chances of state of the sensor.

The bicycle is equipped with the device in question having a transmission circuit mounted on a portion of the bottom bracket/crank gear and/or one of the two wheels that is rotationally movable.

BRIEF DESCRIPTION OF DRAWINGS

The invention will be better understood with reference to the following description and to the attached drawings, in which:

FIG. 3 is a block diagram showing the invention;

DETAILED DESCRIPTION OF THE INVENTION

Figure 1:
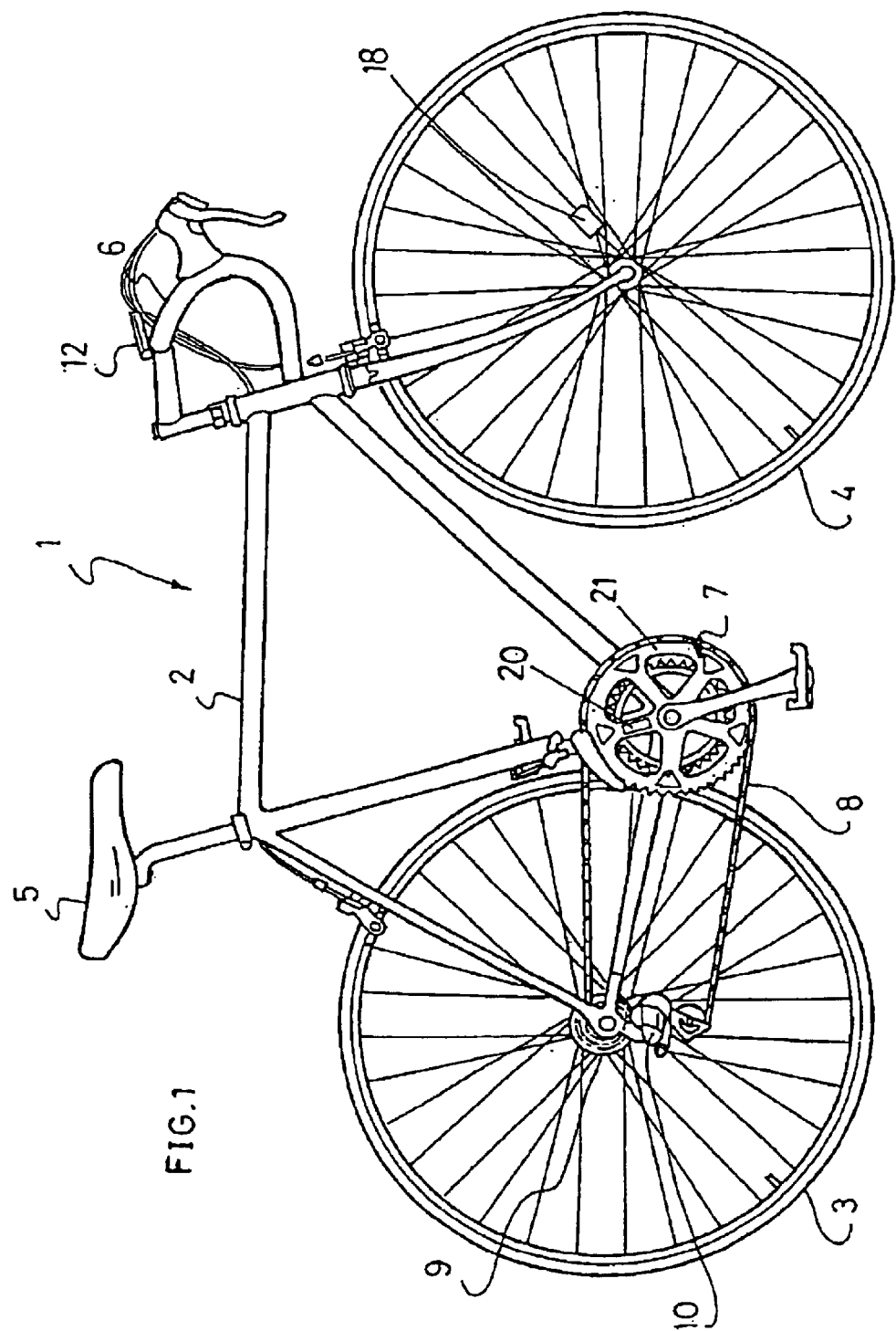
FIG. 1 is a side view of a bicycle equipped with the device according to the invention.

FIG. 1 shows a bicycle 1 having a frame 2, rear and front wheels 3 and 4, a seat 5, a handlebar 6 for steering, and a transmission assembly having a front bottom bracket assembly 7, a transmission chain 8, a rear cassette sprocket 9, and a rear derailleur 10.

These parts are given only for guidance in order to better understand the invention. Any known and appropriate construction is suitable, and there are numerous technical equivalents of construction.

Figure 2:
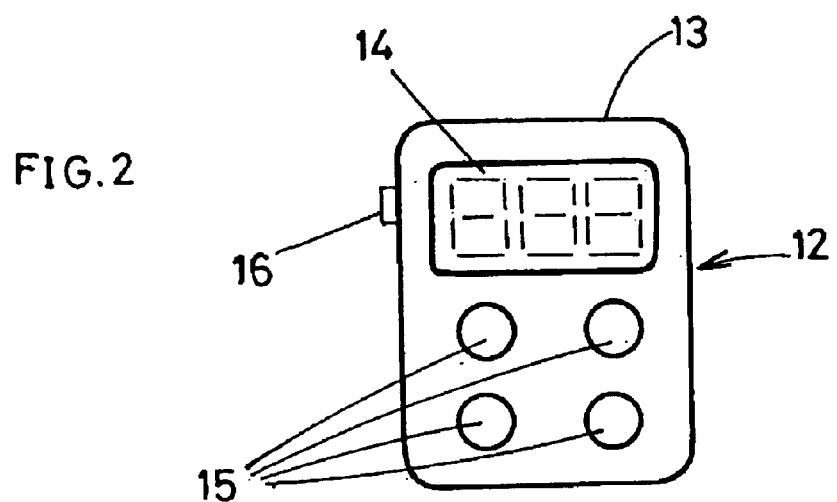
FIG. 2 is a top view of the odometer mounted on the handlebar.

FIG. 1 further shows what is commonly called a counter 12 that is mounted on the handlebar 6. As shown in FIG. 2, the counter can be in the form of a counter casing 13 having a display unit 14 that is a digital liquid crystal display (LCD), for example, and function buttons 15 to control the function displayed by the display unit. A start/stop button 16 can also be provided.

On the inside, the casing houses an electronic reception circuit that controls the display unit and will be described later, as well as a power battery.

According to the embodiment shown, the counter 12 is connected to a first electronic transmission circuit housed in a casing 18 associated with the front wheel. This circuit, which is described in more detail below, is adapted to measure the rotating speed of the wheel and, based on that, to determine, for instance, the linear speed, the distance covered, the average speed, as well as other possible running or operating parameters.

A characteristic of the casing 18 is that it is mounted on the turning portion of the wheel and, as a result, it turns with the wheel about the hub axis. FIG. 1 shows the casing 18 mounted on a spoke. This is not limiting as the casing could be mounted on other movable members of the wheel, for example, the rim, the flanges for fastening the spokes, or the hub body. Another possibility would be to use the hub body as a casing, or to integrate the casing in the hub body or in the rim.

According to another alternative, the casing 18 could be mounted on the rear wheel.

Another electronic transmission circuit is housed in a casing 20 associated with the bottom bracket. FIG. 1 shows the casing 20 mounted on a plate 21, or a chain wheel, of the transmission assembly. This is not limiting as the casing could be mounted on one of the cranks, or yet one of the cranks could have a cavity that forms the casing. What is important is that the casing 20 turns about the bottom bracket axis with the rotation of the cranks.

The circuit housed in the casing 20 is adapted to measure the pedaling rate and, in addition or alternatively, other parameters derived therefrom.

These two measurements of the rotating speed of the wheel and of the bottom bracket are not limiting for the invention. In other words, the invention could be applied to either one, as well as to any part of the bicycle that has a revolving movement about an axis.

In order to simplify the understanding of the invention, the invention will now be described in the particular application to the measurement of the pedaling rate, and therefore to both the transmission 23 and reception 24 circuits that are enclosed in the casings 13 and 20.

Figure 4:
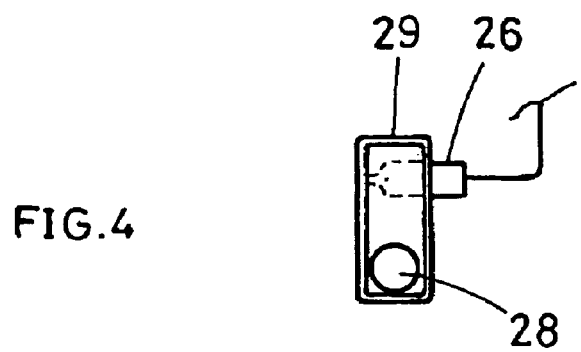
FIG. 4 shows the sensor of FIG. 3 in a deactivated position.

The first element of the transmission circuit 23 is a sensor capable of reacting to a revolution of the member on which it is mounted, such as the plate or chain wheel 21, through a change of state at a given moment in the period of revolution of the movable member. According to the embodiment shown, the sensor is a Reed relay 26 having the characteristic that the magnet that causes the contacts to close is a round pellet 28 housed in a long, small compartment 29, the bulb being pressed against the compartment towards one of its ends. In FIG. 3, the compartment is shown in the position where the magnet is in front of the Reed bulb. In FIG. 4, it is shown in the opposite position which would be achieved after a 180° rotation of the plate or chain wheel 21. Because of gravity, the magnet falls toward the other end of the compartment and the Reed bulb is then deactivated. Thus, a cycle of changes of state of the sensor has a closing and opening of the Reed relay that occur with the movement of the magnet in its compartment. Since the relay is mounted on the movable member with the magnet, no adjustment needs to be made in the area of the sensor.

The Reed bulb is connected to a first circuit 32 that transforms the signal. The outgoing signal from this circuit is a periodic signal which has the same frequency as the rotational frequency of the plate or chain wheel 21.

It is directed along two different lines. In the first line, the signal is sent to a calculation circuit 34 which determines the duration of the cycle of the Reed relay at each period of revolution of the plate, i.e., the instantaneous pedaling rate based on the closing of the relay, for example.

An auxiliary smoothing and filtering circuit 36 determines a representative value of the pedaling rate based on values of instantaneous rate measured over a predetermined length of time. This representative value is calculated through smoothing over a length of time comprised, for example, between 2 and 5 seconds. This predetermined length of time relates to the time separating two successive transmissions from the transmitter in the direction of the receiver. Furthermore, the filtering function of the circuit 36 has the object of removing incorrect values that would not be coherent with the neighboring values.

The next circuit 38 is an analog-to-digital converter that converts the representative value originating from the circuit 36 to a digital value. Several conversion methods can be used. In particular, the signal can be converted into decimal binary code, or yet hexadecimals. The important thing is that the signal originating from the circuit 38 be a digital signal.

Figure 5:
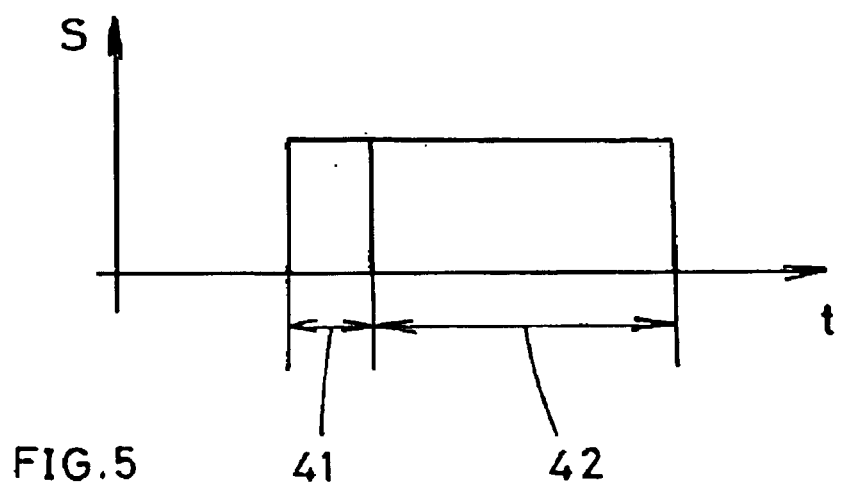
FIG. 5 schematically shows the pattern of the transmitted message.

This digital signal is sent to a circuit 40 for forming the transmission pattern that will be transmitted by the transmitter 43 in the direction of the receiver. The transmission pattern is schematically shown in FIG. 5, by way of example. It has an address word 41. This address word is a prerecorded digital code which is also loaded into the receiver. It allows the receiver to identify the messages that are addressed to it. The transmission pattern further has a data message 42 that originates from the circuit 40. If necessary, other words can be added to the transmission pattern for additional functions.

The transmitter 43 is of any appropriate type. The frequency of its carrier is preferably comprised between 10 and 150 kHz or better yet between 30 and 50 kHz for a transmission over a short distance, where the bicyclist's body is transparent. The transmission pattern is modulated on the carrier through frequency modulation or amplitude modulation, or the like. Preferably, a frequency modulation transmission that adapts well to the transmission of digital signals is used.

The signal is transmitted by the transmitter from a directional antenna 44. According to the embodiment shown, the antenna is formed of a coil wound about a ferrite rod. Other methods for constructing the antenna could also be used. The important thing is that the antenna be directional. This enables one to decrease the power of the transmitter and therefore its power consumption. Also, one avoids polluting the bicycle environment.

The transmitter signal is received by the antenna 46, then processed by the reception circuit 24 that is located in the area of the handlebar in the casing 13. The antenna 46 is of the same type as the transmitting antenna 44 and, as shown for example, it is formed of a coil wound about a ferrite core.

Past the antenna, the receiving circuit 24 has a receiver 48 that receives the transmission of data, sends it to the decoding circuit 50 that decodes the destination address, and isolates the data message 42. The next circuit 52 transforms the data signal originating from the circuit 50 and controls the display 14 so that it displays a representative value of this signal. This value can be a digital value in the form of a digital display. In an alternative embodiment, one could display this value in the form of a pictograph, for example, a series of lines showing the needle of a mechanical type speedodometer in its various positions.

The circuit 52 can be given other functions of processing the data signal originating from the circuit 50. In particular, it could be given functions for calculating the average pedaling rate over a predetermined time, over the duration of the output, or the like. The circuit 52 could be given functions for calculating other functions that are usually used on commercial counters. It is in the area of this circuit 52 that the contactors associated with the function buttons 15 would be connected.

In the case of measuring a rotational speed of the wheel, the principle for transforming the signal originating from the speed, processing, transmitting, decoding and display sensor would be the same as that which has been described previously. The circuit below the display would have the additional function of calculating the linear speed of the bicycle based on the rotational speed of the wheel, and other functions usually used, such as calculating the average speed, the distance covered, the cumulated distance covered, and yet other functions. The display of these various functions would be controlled by the function buttons 15.

With respect to the transmitter, in order to prevent the movement of the magnet in its compartment from being influenced by the centrifugal force imparted by the wheel rotation, one can provide to mount the casing 18 as close to the wheel axis as possible. In an alternative embodiment, instead of mounting the magnet on the wheel, it could be mounted in a stationary manner to the bicycle frame, for example, to a stay of the fork. One could also use a sensor other than a Reed bulb, for example, an accelerometer or another sensor capable of reacting to its position about an axis of revolution.

The circuit 24 could also be designed to process data originating from several different transmitters, for example, one in the area of the bottom bracket and one in the area of the wheel.

In both cases, the transmitter circuit, its sensor and its antenna are mounted on the rotating member and turn with it about its axis of rotation.

In its application to the pedaling rate, since the casing containing the transmitter and the antenna is mounted on the plate, the orientation of the antenna varies with the plate rotation. Under these conditions, an optimization circuit is responsible for controlling the moment when the transmitter is activated. The optimum moment of transmission occurs when the two antennas 44 and 46 are parallel and aligned, and when they are the closest to one another. This optimization allows decreasing the power consumption of the transmitter. First of all, the transmitter will not transmit upon each turn of the bottom bracket. Also, at the times that it does transmit, the conditions of transmission with the receiver are optimal. In these conditions, transmission requires low power.

In order for the antennas to be parallel, they are both oriented in the longitudinal and vertical plane defined by the frame, or in an orientation approximate to this plane.

Figure 6:
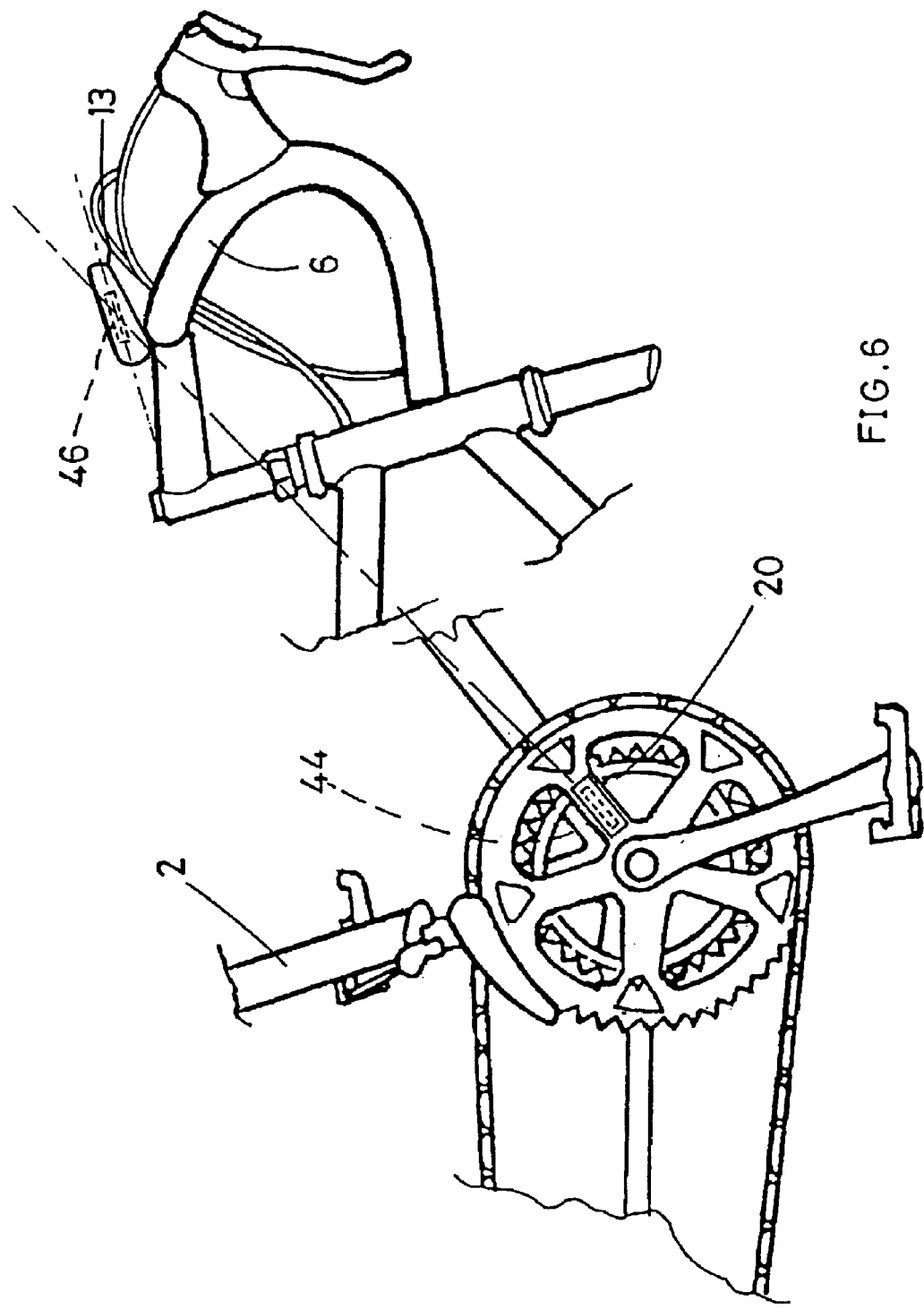
FIG. 6 is a partial view of the bicycle of FIG. 1 showing an optimum moment of transmission.

If the orientation of the receiving antenna in its casing does not allow the alignment of the transmitting antenna with the receiving antenna, as illustrated in FIG. 6, it is preferred that the optimum moment be the moment when the transmitting antenna is directed toward the receiving antenna, in the position where it is the closest to the receiving antenna. This is suitable if at that moment the directions of the two antennas together form an angle approximate to 180°, preferably greater than 135°. As a matter of fact, it is known that a misalignment of the antennas creates little loss in the yield efficiency of the transmission as long as the misalignment is limited to several tens of degrees.

If this is not possible, which is the case for the transmitting antenna of the front wheel, it is preferred that the optimum moment be the moment when both antennas are parallel.

At that optimum moment, it is said that the transmitting antenna has its optimal orientation.

As an alternative embodiment, a second optimum moment and a second optimal orientation could be introduced during a revolution cycle of the plate or of the wheel, at the moment when the transmitting antenna is diametrically opposite its first optimal orientation.

As for the duration of the transmission, it is very short, lasting for several hundredths of a second, such that one can consider that both antennas keep the same relative orientation throughout the transmission.

The optimization circuit that controls the transmitter 43 has an orientation circuit 58. This circuit retrieves from the transforming circuit 32 the information relating to the closing or opening of the Reed bulb corresponding to the change of state of the sensor. This allows for each turn of the bottom bracket to initialize the orientation of the plate or chain wheel and of the antenna periodically in their revolution about the bottom bracket axis.

Based on these initialization values, the circuit 58 calculates the estimated time at the end of which the bottom bracket will have reached its optimal orientation.

The optimum moment here is determined by extrapolation, for example. One deducts an optimum moment value from the period of rotation of the bottom bracket during the preceding rotation cycle, taking into account the rotational angle along which the plate must travel between its initialization orientation and its optimal orientation. In other words, if $T_n$ designates the optimum moment at the $n^{th}$ rotation of the plate, $t_n$ designates the initialization moment and x designates the angle between the optimal orientation of the plate and its orientation, the moment $T_n$ is calculated by the following formula:

$$T_n = t_n + (t_n - t_{n-1}) \cdot (360/x).$$

In fact, this is an estimated value of the real moment when the antenna passes in its optimal orientation.

Any other appropriate technique could also be used. In particular, the estimate could be improved by performing the extrapolation over several rotational cycles of the plate or through an optimization technique.

At each optimum moment, the circuit 58 sends an optimum moment signal to the circuit 60 for controlling the transmitter.

Furthermore, a clock circuit 62 sends a periodic signal to the circuit 60. The time of this signal is the time when one wishes that the value displayed on the display be refreshed. As indicated previously, this refresh period can be on the order of 2–5 seconds. In fact, one can use the clock circuit to control the smoothing circuit 36. The refresh period can vary depending on the high or low pedaling rate. In particular, the period can be reduced when the pedaling rate is very low in order to avoid an excessive delay in the transmission of the data in the direction of the receiver.

The circuit 60 for controlling the transmitter determines the moment when it receives, from the circuit 58, the first optimum moment signal that intervenes at the end of each refresh period. At that time, it sends to the transmitter an activation signal that activates its transmission.

In other words, at the end of each refresh period, the transmitter is on standby and waits for a signal of optimum moment to send its transmission. Under these circumstances, it does not send its transmission at each turn of the plate but rather during the first passage of the antenna in its optimal orientation that follows the end of a refresh period. The length of time that separates two successive transmissions from the transmitter corresponds very closely to the refresh period. The transmitter remains inactive during the following optimum moment signals until a new refresh period has elapsed.

For the pedaling rate, an actual range extends from 40 to 200 turns/minute, i.e., roughly 1–3 turns/second. Under these circumstances, a wireless transmitter from prior art would transmit 1–3 times/second, depending on the rate. According to the invention, the transmitter is activated once every 2–5 seconds, depending on the refresh period selected. The number of transmissions in a given time is markedly much lower, in addition to which it is independent of the rate itself.

This is even more obvious with a wheel. If one takes a rotational speed of 5 turns/second, a refresh period of 2 seconds, the transmitter according to the invention transmits 10 times less than a conventional transmitter which would transmit at each turn of the wheel.

Advantageously, the circuits are obtained in a CMOS technology, or the equivalent, using very low energy consumption, and it is the power necessary to the transmission which consumes the energy. It is to be understood in these conditions that the device according to the invention allows saving a substantial amount of electric energy.

Furthermore, the device is easier to install since the sensor does not require any special adjustment.

The invention is not limited to the particular preceding description, the invention encompassing possible alternative embodiments.

In particular, the actions that are initiated at predetermined moments could be delayed for a predetermined time.

Also, the circuits that have been described are not limiting, nor are their functions. Certain functions described in the area of the receiver could be performed in the area of the transmitter. In particular, the function for calculating an average value, if it exists, could be calculated in the area of the transmitter. Under these circumstances, the data message transmitted by the transmitter would contain the momentary value and the average value. The value sent to the display would be selected in the area of the receiver. Furthermore, circuits described as being separate could be merged.

The overall concept of the invention is in fact to obtain, in the area of the transmitter casing, an at least partial processing of the measuring signal and to activate the transmitter at moments independent of the rotational period of the wheel or of the plate so that it can transmit an enriched signal in the direction of the counter. These moments when the transmitter is activated are optimized depending on the relative position of the two antennas.

What is claimed is:

1. A device for measuring running parameters of a bicycle including:
    a sensor capable of reacting to a revolution of a rotationally movable member through a change of state and operating according to a cycle of changes of state, the sensor being adapted to be mounted on a rotatable member of the bicycle;
    a transmission circuit having an antenna, the transmission circuit adapted to receive a signal from said sensor;
    a reception circuit having an antenna;
    wherein the transmission circuit has a circuit for calculating a value of the running parameter based on the signal received from the sensor, a transmitter connected to the antenna of the transmission circuit to transmit said value to the reception circuit and an optimization circuit for activating the transmission of the transmitter at moments independent of a periodicity of changes of state of the sensor.

2. A device according to claim 1, wherein the optimization circuit has an orientation circuit determining at least one optimum moment of transmission during the period of a cycle of change of the state of the sensor.

3. A device according to claim 2, wherein the orientation circuit calculates the optimum moment based on a moment of change of state of the sensor and a fraction of a period of a cycle of change of state determined by extrapolation over the period of one or several preceding cycles of change of state.

4. A device according to claim 2, wherein the optimization circuit has a clock circuit that sends a periodic signal.

5. A device according to claim 4, wherein the clock circuit has a period of between 2 and 5 seconds.

6. A device according to claim 3, wherein the optimization circuit has a circuit for controlling the transmitter which determines an optimum moment of transmission as being a first optimum moment following a periodic signal of the clock circuit and which activates the transmitter at said optimum moment.

7. A device according to claim 1, wherein the sensor is a Reed relay placed against a long compartment in which a magnet is housed.

8. A device according to claim 1, wherein the calculation circuit has a digital conversion circuit.

9. A device according to claim 4, wherein the circuit for calculating a value of the operating parameter has a smoothing circuit operating over a period equal to the periodic signal of the clock circuit.

10. Bicycle having a frame, two wheels, a handlebar, a bottom bracket, wherein the bicycle is equipped with a device according to claim 1, with a transmitter circuit mounted on the portion of the bottom bracket and/or of one of the two wheels that is rotationally movable.

11. A device according to claim 1, wherein the optimization circuit activates the transmission of the transmitter during rotation of said rotationally movable member.

12. A device according to claim 1, further comprising a transmitter casing, wherein the transmission circuit is housed within the transmitter casing, and wherein transmissions from said transmission circuit activated by the optimization circuit and emitted from said transmitter casing are transmitted at moments during rotation of said rotationally movable member independent of the periodicity of changes of state of the sensor.

13. A device according to claim 1, wherein the optimization circuit is a power conservation circuit adapted to activate the transmission of the transmitter at a rate of less than once per cycle of changes of state of the sensor.

14. A device according to claim 1, wherein the optimization circuit is a power conservation circuit adapted to activate the transmission of the transmitter at a rate of less than once per revolution of the rotationally movable member.

15. A device for measuring operating parameters of a bicycle comprising:
   a sensor having a first state and a second state and being adapted to be affixed to a rotationally movable member of the bicycle, said sensor being constructed to change from said first state to said second state and to return to said first state in response to rotational movement of said rotationally movable member;
   a transmission circuit connected to said sensor to receive a signal from said sensor;
   a reception circuit;
   said transmission circuit comprising:
      a calculating circuit for calculating a value representative of a measured operating parameter of the bicycle based upon a signal received from said sensor;
      a transmitting antenna;
      a transmitter connected to said transmitting antenna for transmitting a signal representative of said calculated value to said reception circuit;
      an optimization circuit for activating said transmitting of said transmitting antenna at moments independent of a periodicity of changes of state of said sensor.

16. A device according to claim 15, wherein:
   said change of said sensor from said first state to said second state and return to said first state is one cycle of changes of state of said sensor;
   said optimization circuit is a power conservation circuit adapted to activate said transmitting of said transmitting antenna at a rate of less than once per cycle of changes of state of said sensor.

17. A device according to claim 15, wherein:
   said optimization circuit is a power conservation circuit adapted to activate said transmitting of said transmitting antenna at a rate of less than once per revolution of the rotationally movable member.

18. A device according to claim 15, wherein:
   one of the operating parameters is speed of the bicycle;
   said rotational movable member is a wheel of the bicycle, said speed of the bicycle being calculated with reference to rotational speed of the wheel of the bicycle;
   said optimization circuit is a power conservation circuit adapted to activate said transmitting of said transmitting antenna at a rate of less than once per revolution of the wheel of the bicycle.

19. A device according to claim 15, wherein:
   said optimization circuit activates said transmitting of said transmitting antenna during rotation of said rotationally movable member.

20. A device according to claim 15, further comprising:
   a transmitter casing, said transmission circuit being housed within said transmitter casing;
   wherein transmissions from said transmission circuit activated by said optimization circuit are emitted from said transmitter casing at moments during rotation of said rotationally movable member independent of the periodicity of changes of state of said sensor.

21. A device according to claim 15, wherein:
   said optimization circuit comprises an orientation circuit for determining optimum moments of transmitting of signals by said transmitting antenna based upon an orientation of said transmitting antenna.

22. A wireless transmitting/receiving device for measuring at least one operating parameter of a bicycle, said device comprising:
   a transmitter casing adapted to be mounted on a rotatable member of the bicycle;
   a receiver casing having a display unit for displaying at least said operating parameter of the bicycle, said receiver being adapted to be mounted on the bicycle for observation of the display unit by a rider of the bicycle;
   a sensor for sending periodic signals in reaction to, and at a frequency equal to, a rotational frequency of the rotatable member;
   within said receiver casing, said device further comprises a receiver circuit;
   within said transmitter casing, said device further comprises:
      a transmission circuit connected to said sensor for receiving said signal sent by said sensor, said transmission circuit comprising:
         a calculator circuit for calculating a value representative of a measured operating parameter of the bicycle based upon said signal of said sensor;
         a transmitting antenna;
         a transmitter connected to said transmitting antenna for transmitting a signal representative of said calculated value to said receiver circuit within said receiver casing;
         an optimization circuit for activating said transmitting of said transmitting antenna at a frequency different from the rotational frequency of the rotatable member.

23. A wireless transmitting/receiving device according to claim 22, wherein:
   said optimization circuit activates said transmitting of said transmitting antenna at a frequency less than the rotational frequency of the rotatable member.

24. A wireless transmitting/receiving device according to claim 22, wherein:
   said sensor is positioned within said transmitter casing.

25. A wireless transmitting/receiving device according to claim 22, wherein said optimization circuit comprises:
   a transmitter controller for controlling activation of said transmitter;
   a clock circuit for sending a periodic signal to said transmitter controller, said periodic signal being sent at a frequency equal to a predetermined frequency for refreshing a value displayed by said display unit of said receiver casing.

26. A wireless transmitting/receiving device according to claim 25, wherein:
   said optimization circuit comprises an orientation circuit for determining optimum moments of transmitting of signals by said transmitting antenna based upon an orientation of said transmitting antenna.

27. A wireless transmitting/receiving device according to claim 22, wherein:

said optimization circuit is a power conservation circuit adapted to activate said transmitting of said transmitting antenna at a frequency of less than once per revolution of the rotatable member.

28. A wireless transmitting/receiving device for measuring at least one operating parameter of a bicycle, said device comprising:

a transmitter casing adapted to be mounted on a rotatable member of the bicycle;

a receiver casing having a display unit for displaying at least said operating parameter of the bicycle, said receiver being adapted to be mounted on the bicycle for observation of the display unit by a rider of the bicycle;

a sensor for sending periodic signals in reaction to, and at a frequency equal to, a rotational frequency of the rotatable member;

within said receiver casing, said device further comprises a receiver circuit;

within said transmitter casing, said device further comprises a transmission circuit connected to said sensor for receiving said signal sent by said sensor, said transmission circuit comprising means for emitting signals from said transmitter casing to said receiver circuit at a rate differing from the rotational frequency of the rotatable member.

* * * * *